United States Patent
Hawkins et al.

[11] Patent Number: 6,068,250
[45] Date of Patent: May 30, 2000

[54] COMPOSITE MULTI-WAVE COMPRESSION SPRING

[75] Inventors: James T. Hawkins, Cincinnati, Ohio; Michael Hawkins, Placentia, Calif.

[73] Assignee: Proteus Engineering Inc., Cincinnati, Ohio

[21] Appl. No.: 09/274,713

[22] Filed: Mar. 22, 1999

Related U.S. Application Data

[63] Continuation of application No. PCT/US96/15112, Sep. 24, 1996.

[51] Int. Cl.[7] .................. F16F 1/20; F16F 1/18; F16F 1/36; F16F 1/06; F16F 1/00
[52] U.S. Cl. .................. 267/162; 267/158; 267/148; 267/164; 267/166; 267/181
[58] Field of Search ..................... 267/162, 164, 267/165, 182, 181, 166, 148, 149, 158, 160, 161, 180, 144, 167

[56] References Cited

U.S. PATENT DOCUMENTS

| | | | |
|---|---|---|---|
| 101,724 | 4/1870 | French | 267/166 |
| 2,171,185 | 8/1939 | Maier . | |
| 2,678,685 | 5/1954 | Volsk . | |
| 2,888,258 | 5/1959 | Hoffstrom . | |
| 3,042,391 | 7/1962 | Glaser . | |
| 4,260,143 | 4/1981 | Kliger | 267/143 |
| 4,380,483 | 4/1983 | Kliger | 156/169 |
| 4,473,217 | 9/1984 | Hashimoto | 267/149 |
| 4,660,811 | 4/1987 | Mühlhahn et al. . | |
| 4,753,423 | 6/1988 | Ukai et al. . | |
| 4,765,602 | 8/1988 | Roeseler . | |
| 4,858,897 | 8/1989 | Irifume . | |
| 4,901,987 | 2/1990 | Greenhill et al. | 267/166 |
| 5,062,619 | 11/1991 | Sato . | |
| 5,222,718 | 6/1993 | Buck . | |
| 5,558,393 | 9/1996 | Hawkins et al. | 267/162 |
| 5,622,358 | 4/1997 | Komura et al. | 267/166 |
| 5,639,074 | 6/1997 | Greenhill et al. | 267/162 |
| 5,678,809 | 10/1997 | Nakagawa et al. | 267/148 |

OTHER PUBLICATIONS

Smalley Steel Ring Company, Wheeling, Ililnois, *Engineering and Parts Catalog*, Catalog No. WS–93.

*Primary Examiner*—Christopher P. Schwartz
*Assistant Examiner*—Jeffrey Woller
*Attorney, Agent, or Firm*—Wood, Herron & Evans, L.L.P.

[57] ABSTRACT

A circular multi-wave composite compression spring (10) is formed from a carbon fiber (58) reinforced laminate. The circular compression spring (10) is comprised of unidirectional graphite fibers (58) encased in a polymeric resin of generally rectangular cross-section such that adjacent crests (14) and troughs (16) of the waves in adjacent turns (12) of the spring (10) contact each other along a radial line generally extending from the longitudinal axis (30) of the spring (10). The line contact provides for increased fatigue life and more stable loading of the spring (10) under compression. The carbon fiber reinforced laminate provides comparable strength characteristics similarly configured springs fabricated from conventional materials while providing significantly reduced weight. Furthermore, the composite spring (10) offers increased performance parameters such as increased linearity response over a wider spring deflection range and with insignificant hysteresis.

18 Claims, 3 Drawing Sheets

COMPOSITE MULTI-WAVE COMPRESSION SPRING

This is a continuation in part of PCT patent application No. PCT/US96/15112 filed Sep. 24, 1996 which designated the U.S. and is hereby incorporated by reference in its entirety.

BACKGROUND OF THE INVENTION

The present invention relates to compression springs.

Circular compression springs can be used in all kinds of machinery and have a number of uses in the aerospace and automotive industries for vehicle suspension systems and various other mechanical applications. Specifically, the automotive industry recently has been attempting to reduce vehicle weight in order to lower costs and provide decreased fuel consumption. The substitution of lightweight materials for heavy metallic materials commonly used in automobile parts is one method currently envisioned to decrease vehicle weight.

Metal circular compression springs are also used within multitudes of machines such as automobiles, trains, trucks, busses, etc. Fatigue failure commonly occurs in parts which are subjected to continually varying stresses, for example, circular multi-wave compression springs. However, the vibratory capacity and endurance of the metal springs limit the length of time and frequency during which these machines can be operated without replacement of the metal springs due to fatigue failure.

A metal multi-wave compression spring of the type described is disclosed in U.S. Pat. No. 4,901,987. Wave springs by their very nature, including those of the type disclosed in U.S. Pat. No. 4,901,987, are prone to fatigue failure. The springs are flexed repeatedly and the cross-section of each turn of the spring is generally thin and the spring is stressed very often to the highest possible limit. Wave springs are normally made of hardened and tempered metal in which the metal is deformed plastically to create the waves. This deformation induces residual compressive and tensile stresses in different surfaces of the wave. After loading, the residual stresses increase the effective applied stresses on the spring. Apart from the fatigue life characteristics of the spring, the load resulting from the combined residual and applied stresses may exceed the yield strength of the material and result in catastrophic failure of the spring.

Another problem associated with metal wave compression springs is the method typically used to form the spring. In order to produce multi-wave compression springs, a metal filament is typically edge wound into the circular configuration of the spring. As a result of the material twist resulting from edge winding, the contact area between the crests and troughs on adjacent turns of the multi-wave spring is not between parallel surfaces but rather the turns meet at a point. More particularly, the steel or metal multi-wave compression springs being edge wound are not uniformly planar in a radial direction outward from a longitudinal axis of the spring. As a result, only the outer edges of each crest and trough contact at a point. The point loading at each adjacent crest and trough establishes a large point loading contact stress which wears on the outer edge of the spring. The point contact results in rubbing between the adjacent crests and troughs during repeated and successive loading of the spring. The friction created at the point contact between each crest and trough results in galling on the surface of the spring filament. The point rubbing or galling reduces the fatigue life and creates a sharp edge. The sharp edge adds a large stress concentration factor further deteriorating the contact area and ultimately creating a crack initiation site in the spring which potentially leads to catastrophic failure.

Another problem associated with metallic multi-wave compression springs is the non-linearity of the spring response. The effects of the point contact between the adjacent crests and troughs of the metal spring in combination with the production methods typically used for such springs results in a linear spring rate over a very narrow deflection range or a non-linear spring response over a larger deflection range. A "linear" spring response, spring constant or spring rate as referred to herein means that a constant incremental applied force results in a constant incremental deflection of the spring.

A further problem associated with metal multi-wave springs is hysteresis. Hysteresis is the difference in a plot of the force/deflection of a spring as it is loaded compared to when the load is being removed. The difference between the force/deflection plots of the loading and unloading of a metal multi-wave spring is significant. A large hysteresis results in inconsistent spring performance; especially at high frequency loading and unloading conditions.

Many of these and other problems in the art are overcome by the spring disclosed in U.S. Pat. No. 5,558,393, assigned to the assignee of this application and hereby incorporated by reference in its entirety.

It has long been known to use composites materials as a substitute for metallic leaf springs and metallic coil springs. The use of composite materials provides a low weight substitute for metal springs. However, the benefits of composite materials have not been fully realized for use in multi-wave compression springs due in part to the characteristics of the waves and the forming requirements associated with the waves. Forming the waves into the turns of a cured composite ribbon or coil spring is impractical and would result in the cracking, breaking, or destruction of the fibers and/or resin matrix of the composite material. Moreover, even if the cured composite ribbon could be edge wound as is done with metal ribbons, the crests and troughs would still be canted resulting in point contact and all of the disadvantages associated therewith.

Furthermore, by their very nature multi-wave springs have a significant amount of contact and/or rubbing at the wave crest and trough interfaces. Multi-wave springs should be capable of being used in a wide variety of environments and conditions, including industrial and automotive applications which can be very non-sterile, dirty and have many particulate contaminants. These dirt particles and other contaminants could interfere with the wave crest and trough interfaces and cut, degrade or otherwise damage the composite materials, particularly the fibers.

It has therefore been an objective of this invention to provide an improved, lightweight circular compression spring.

It has been a further objective of this invention to provide a lightweight circular multi-wave compression spring that avoids the fatigue and performance characteristics associated with metal multi-wave compression springs.

It has been a still further objective of this invention to provide such a spring which offers adequate strength and provides a longer useful life.

SUMMARY OF THE INVENTION

These and other objectives of the invention have been attained by a preferred embodiment of the invention for example comprising a multi-wave compression spring made of a composite material through the use of a molding process which forms the final spring shape in the material prior to setting. The spring is made from a composite laminate which is circularly coiled and formed into a mold with a generally sinusoidal wave pattern and then cured. These springs are described as "multi-wave" because of the particular orientation of the individual spring turns in which the crest portions of the waves of one turn are aligned with and contact the trough portions of the waves in the turns immediately adjacent to it. The spring of this invention is formed from fiber reinforced thermally set resin laid up with a rectangular cross-section into a continuously circular and substantially sinusoidal wave path.

In a presently preferred embodiment of the invention, each of the waves in the center turns of the compression spring have the same amplitude. The amplitude of the waves in regions adjacent the center turns incrementally diminishes down to zero amplitude yielding flat regions at opposite ends of the spring. The last spring turns at opposite ends of the spring form flat circular shim ends and provide planar load bearing surfaces generally perpendicular to the longitudinal axis of the spring.

A composite spring according to a presently preferred embodiment of the invention can be produced virtually the same size as a comparable multi-wave metallic spring, and it is anticipated that it will have a longer useful life than such an equivalent metallic multi-wave spring. In addition, the weight of the composite spring according to this invention is about one-half of the weight of a comparable metallic multi-wave compression spring and approximately one-sixth that of a typical coiled metallic compression spring. Furthermore, the cost of composite springs according to this invention is substantially less than those made from exotic lightweight metallic alloys and the weight savings afforded by the present invention is substantial in comparison to conventional spring materials. It is anticipated that utilization of the composite springs according to this invention will save significant fuel costs in automobile and other transportation applications in comparison to conventional metallic springs.

The application of graphite composite materials in multi-wave compression springs greatly improves the fatigue life while allowing for comparable or even higher load applications while reducing spring weight. In one embodiment, unidirectional graphite pre-preg tape is laid into a mold cavity to induce virtually zero residual stress. After wrapping the laminate into the mold, the resin is set or solidified in the appropriate shape to yield a stress-free multi-wave spring.

Fatigue cycling is an important consideration in wave springs. By the application of composite materials to the wave spring design, a significant improvement is achieved in fatigue life. Normally composites can be utilized to about 100% of their tensile strength for their entire useful life. This compares to 40–50% of tensile strength for steel springs in a similar application.

The multi-wave composite compression spring according to this invention overcomes the problems of point contact between adjacent crests and troughs of metallic multi-wave compression springs by providing at least line contact between the adjacent crests and troughs. The meeting wave sections act as bearing surfaces. The formation process of the spring according to this invention enables the manufacture of a multi-wave compression spring which has linear contact surfaces. The contact surfaces are generally planar and perpendicular to the longitudinal spring axis.

Linear contact surfaces provide numerous advantages which improve the fatigue life of the spring including the reduction of concentrated stresses. In addition, the buckling stability of the spring improves over springs fabricated with only point contact at the wave interfaces by providing a flatter surface for uniform load bearing support. Increased contact area of the composite spring of this invention is a superior factor in improving fatigue life over comparable metallic springs.

In addition, the coefficient of friction of many composite materials is approximately 40%, or less, of that of steel. The reduced friction between two mating waves of the preferred embodiment eliminates most of the wear which can occur on metallic springs and enhances the linearity of the spring response. In contrast, as the load on a metal spring increases, the friction forces decrease the ability of such a spring to slide with respect to itself thereby affecting the metal spring constant.

The spring of this invention has a more linear spring constant because the friction force between contacting portions of the spring is significantly reduced by using composite materials. The friction force is directly related to the coefficient of friction between the mating waves. Reducing the coefficient of friction allows the waves to more easily move relative to each other. As the force is applied to the spring, the friction force between the mating waves increases but due to the reduced coefficient of friction the mating waves are still capable of sliding relative to one another. In a presently preferred embodiment of the present invention, an additional reduction in friction and wear in the contact regions is achieved by the use of a lubricous or anti-friction coating applied in a contact region between the adjacent crests and troughs of the spring.

Hysteresis is also reduced by the composite materials and lubricous coatings. Wave springs normally exert more expansive force under loading conditions than upon unloading conditions. This effect is known as hysteresis. The reduction in friction of composite materials minimizes the hysteresis effect so that the plot of force/deflection is approximately the same under both loading and unloading conditions.

Other factors which lead to the advantages of a composite multi-wave compression spring according to this invention include the thermal expansion of composite materials which is negligible compared to steel springs. In many applications, particularly in the automotive industry, multi-wave compression springs are used in high temperature environments and thermal expansion of the steel springs can detrimentally effect their performance. Also, composite springs are good heat sinks and are able to pull heat from the dampening systems more quickly.

Another advantage of the spring of this invention is that the higher strength and stiffness properties of fiber reinforced polymers allows more energy per unit weight to be stored.

Furthermore, composite springs have benign, or non-catastrophic failure modes. As a result, when a spring according to this invention approaches failure, it can be identified more easily compared to metallic springs and replaced prior to a catastrophic failure.

A composite multi-wave compression spring according to a presently preferred embodiment of this invention is manufactured by providing a mold or form having a groove therein into which a ribbon of graphite fibers in a resin matrix is inserted or laid-up. The waveform or groove is helical and includes a plurality of waves with successive crests and troughs in each turn of the groove. Each crest and each trough in the groove is aligned with a trough and a crest, respectively, in an adjacent turn of the groove. Alternatively, the graphite fibers can be inserted into the groove and the resin injected therein. Preferably, the graphite fibers in the ribbon are aligned generally parallel with each other so that they are concentrically arranged when the ribbon is inserted into the helical groove of the mold. Preferably, in one embodiment, the waves in the center portion of the groove have a constant amplitude and the waves in each region adjacent to the center portion have a gradually and incrementally diminishing amplitude. The waves in an end region of the groove have a zero amplitude to provide a flat portion at each longitudinal end of the resulting spring.

The graphite fibers and resin matrix are then set after being inserted into the groove by applying a combination of pressure and heat. The thermal setting of the composite ribbon can be accomplished in any number of ways as is known in the art including using an autoclave or inserting the mold into a rigid sleeve and then heating the sleeve and mold in order to set the graphite fibers in the resin.

The set ribbon in the form of a multi-wave compression spring is then removed from the mold as for example by melting the mold without effecting the resin matrix of the spring. The mold in one embodiment is made from an appropriate meltable material such as a eutectic metal alloy, plastic or polypropylene. Alternatively, the mold is removed by boring out a center portion of the mold and expanding the spring to crumble or remove portions of the mold between the adjacent turns of the spring. After the mold and spring are separated, the spring is preferably expanded and sprayed with an anti-friction or lubricating coating such as Teflon to insure that the contact regions between the adjacent crests and troughs are coated. Alternatively, a ribbon with Teflon resin could be used to provide lubricous contact between the adjacent waves.

The presently preferred embodiment of the spring is then compacted and sprayed with a silicone or other protective coating to form a pliable film about the contact regions between the waves in order to encase the ribbon and inhibit contaminants such as dust, dirt or other particles from entering the contact regions and interfering with the spring performance or providing a source of friction in the contact regions.

It will be appreciated that the present invention provides a lightweight multi-wave compression spring having comparable or improved strength relative to metallic compression springs but offering improved fatigue life and spring response characteristics.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figures 1, 2, 4, 5:
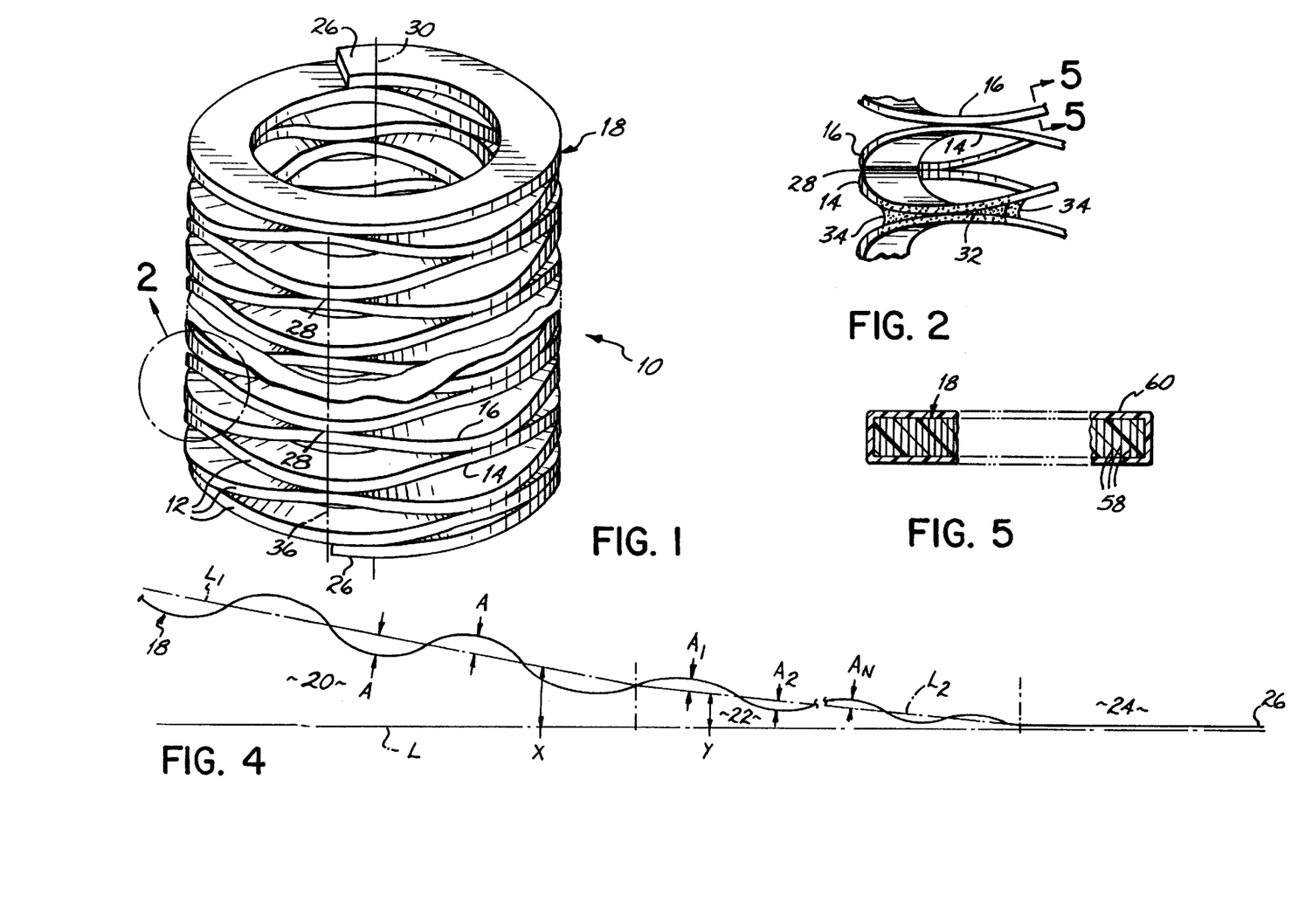
FIG. 1 is a perspective view of a composite multi-wave compression spring according to this invention.
FIG. 2 is an elevational view of encircled area 2 in FIG. 1.
FIG. 4 is a diagrammatic view of a portion of the compression spring shown in FIG. 1 in an uncirculated configuration to show the distinct wave regions of the spring according to an embodiment of this invention.
FIG. 5 is a cross-sectional view along line 5—5 of FIG. 2 showing the composite laminate ribbon and the graphite fibers and anti-friction coating of the spring.

A composite multi-wave compression spring 10 according to one embodiment of the present invention is shown in FIG. 1. Each turn 12 of the compression spring extends generally 360° around the spring 10 and includes successive wave crests 14 and troughs 16 which follow a substantially sinusoidal wave path. The crests 14 and troughs 16 of one spring turn 12 are aligned with and abut the troughs 16 and crests 14, respectively, of the spring turn 12 adjacently above or below it. This particular type of spring configuration is commonly referred to in the art as a "multi-wave" spring. An important aspect of the present invention is that the spring 10 is fabricated primarily of carbon fiber filaments encased in a polymeric resin matrix.

The compression spring 10 is formed by helically forming a ribbon 18 of high tensile strength carbon fiber impregnated with resin in one embodiment of the invention to form a continuous elongated composite laminate in a waveform wherein each individual spring turn is formed in a wave pattern including the crests 14 and troughs 16.

In a presently preferred embodiment of the spring 10, the composite ribbon 18 of the compression spring is generally rectangular (FIG. 5) and the spring has distinct regions formed along its longitudinal axis. The overall amplitude of the waves in any one of these wave regions is generally not equal to the overall amplitude of the waves in the remaining wave regions. As used herein, the term "amplitude" or "wave amplitude" is defined as the distance from a spring turn centerline to the peak of either the wave crest or wave trough. This distance is generally equal to one-half of the free height of an individual wave.

As seen in FIG. 1 and particularly FIG. 4, a first wave region 20 is located in approximately the center portion of the spring 10. One or more spring turns 12 may be present in the first wave region 20 and each such turn includes a series of successive crests 14 and troughs 16 which define a substantially sinusoidal wave path. The amplitude of all the crests 14 and troughs 16 in the first wave region 20 is a constant preselected amount.

A second type of wave region 22 includes two portions each of which are immediately adjacent to the first wave region 20 and on opposite ends thereof. The second wave region 22 includes at least one spring turn 12 and, the amplitude of the crests 14 and troughs 16 in the second wave region 22 is variable. The amplitude of the waves in the second region 22 gradually and incrementally diminishes down to a zero amplitude. The crests 14 and troughs 16 within the second region 22 closest to the first wave region 20 have a greater amplitude than those in the second region 22 which are further away from the first wave region 20. It will be appreciated by one of ordinary skill in the art that because each individual wave in the second wave region 22 contains a corresponding crest 14 and trough 16, the amplitude of each successive crest 14 and trough 16 in the second wave region 22 is reduced relative to the preceding one. The value of incremental reduction of the wave amplitude in the second wave region 22 can be determined by one of ordinary skill in the art as shown in U.S. Pat. No. 4,901,987, which is hereby incorporated by reference.

The diminishing amplitude of the second wave region 22 results in a zero amplitude or generally flat region 24 or shim portion at each longitudinal end of the spring according to the one preferred embodiment of this invention. The flat region 24 comprises at least one turn 12 of the spring and includes the distal or end turn 26 on each end of the spring 10. As a result, the multi-wave compression spring 10 according to this embodiment of the invention provides a stable configuration for the application of a load on each end 26 thereof.

As shown in FIG. 2, each crest 14 and trough 16 in an adjacent turn of the spring 10 meet along a line of contact 28. The line of contact 28 is preferably perpendicular to a longitudinal spring axis 30 and extends in a radial direction outwardly from the spring axis 30. As a result of the line of contact 28 between the crests 14 and troughs 16 in adjacent turns 12 of the spring 10, the load is distributed over the entire radial width of each turn 12 of the spring 10 as opposed to the point contact typical in many metallic multi-wave compression springs as previously described.

To enhance the fatigue life, reduce hysteresis, and improve the linearity of the spring rate of the spring 10 according to this invention, an anti-friction or lubricous coating 60 is applied to the spring 10 (FIG. 5). Preferably, the spring 10 is partially expanded to thereby create a gap between the crests 14 and troughs 16 in adjacent turns 12 of the spring 10 so that the anti-friction coating can be applied to the contact line 28. A preferred anti-friction interface or coating comprises fluorinated ethylene or nylon polymers such as those respectively available under the trade names "Teflon" from E.I. DuPont, DeNemours & Company of Wilmington, Del., and "Duralon" from the Thermoclad Corporation of Norwalk, Calif. Other anti-friction films or coatings can also be used as desired. The anti-friction coating prevents abrasive wear on adjacent surfaces of the waves as the spring 10 is compressed and loads are applied and removed.

In one presently preferred embodiment, Xylan 1010/000 is applied to the spring 10 as an anti-friction coating 60 preferably with a minimum thickness of 0.0005 inches. The Xylan can be applied in one or more coats between which each coat is oven dried at a temperature of 150° F. to 250° F. for 20 to 60 minutes. After the appropriate thickness of Xylan has been applied, it should be cured on the spring for 20 to 60 minutes at 130° F. to 250° F. and then heated to a temperature of 300° F. to 350° F. for 20 to 60 minutes and then air cooled.

As shown in FIG. 2, each contact region or line 28 of the spring 10 of the present invention is preferably encased after the anti-friction coating 60 has been applied. The contact lines 28 are preferably encased with a coating 32 to inhibit contaminants such as dust, grit, or other particles from interfering with the contact between the crests 14 and troughs 16 in adjacent turns 12 of the spring 10. Contaminants could provide an abrasive surface which upon repeated loading of the spring 10 would damage the fibers and structural integrity of the spring 10. Preferably, the contact regions 28 are encased by partially compressing the spring and then spraying a silicone coating 32 to form a film around the contact line 28 and provide a meniscus 34 adjacent to each contact line 28. The coating 32 which encases the contact line regions should be pliable so as not to crack or break and not be excessively thick relative to the wave amplitude to avoid detrimentally interfering with the spring performance. Alternatively, the spring 10 could be covered in a shroud or tube (not shown) or otherwise enclosed to prevent contaminants from entering the contact regions 28.

Figure 8:
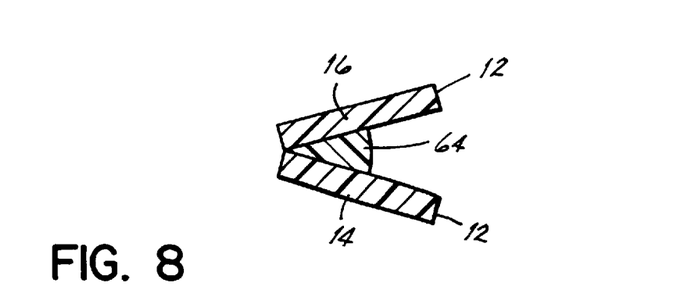
FIG. 8 is an enlarged view of the juncture between bonded adjacent upper and lower turns of the spring according to this invention.

As an alternative to the anti-friction coating, a resin having a Teflon component may be used to bind the graphite fibers together and provide a reduced friction interface between the crests 14 and troughs 16. Specifically, as shown in FIG. 8 the resin used to bind the fiber filaments together and form the ribbon may preferably be accumulated and used as the binding agent between adjacent crests 14 and troughs 16. The binding resin 64 between the adjacent crests 14 and troughs 16 in one embodiment of the spring in which line contact is not present is preferably concentrated at the outer periphery of the adjacent spring turns 12. Typically, the outer perimeter of the mating crests 14 and troughs 16 are in contact but a gap is present at the inner portion of the spring turns. The binding resin 64 between the crests 14 and troughs 16 enhances the performance of the spring by reducing to a minimum the tendency for the spring to buckle or deflect sideways in response to a load, particularly an off-center or off-axis load. Further, hysteresis of the spring 10 is further reduced by the binding resin 64.

Another aspect of a preferred embodiment of the composite multi-wave compression spring 10 according to this invention is the longitudinal alignment on the spring 10 of corresponding contact lines 28 of the spring 10. Individual contact lines 28 between adjacent crests 14 and troughs 16 are aligned with corresponding contact lines 28 longitudinally along the height of the spring 10 to form a line 36 as shown in FIG. 1. The line 36 is generally parallel to the longitudinal spring axis 30 and to other similar lines 36 on the spring 10. The advantage provided by aligning the contact lines 28 in such a way is to provide a more stable spring 10 under off-center or eccentric loading configurations and to prevent buckling when the springs are a large overall length. Forming the spring 10 in such a manner is possible according to the present invention due to the forming process associated herewith, unlike that of edge wound metallic multi-wave compression springs.

In FIG. 4 a planar diagrammatic representation of a portion of the ribbon 18 used to form the multi-wave compression spring 10 according to this invention is shown in an unwound or uncirculated configuration to show the configuration of the mean wave form. FIG. 4 is only a diagrammatic representation because after the composite material used to form the spring 10 has been cured, the ribbon 18 of graphite fibers in a resin matrix could not be uncirculated or straightened out as shown in FIG. 4 without damaging the spring 10. However, the distinct regions 20, 22, 24 along the length of the ribbon 18 used to form a presently preferred embodiment of the spring 10 is shown in FIG. 4. The compression spring 10 has three distinct regions 20, 22, 24 formed therein. The first region 20 includes waves having a constant amplitude as indicated by reference A in FIG. 4 and is located approximately in the center portion of the spring 10. The pair of second wave regions 22, only one of which is represented in FIG. 4, border the first wave region 20. The amplitude $A_1, A_2, \ldots A_N$ of the waves in the second wave region 22 is variable and gradually and incrementally diminishes down to a zero amplitude by an incremental reduction amount. The relationship between the successive waves in the second wave region 22 is well known by one of ordinary skill in the art as taught by U.S. Pat. No. 4,901,987, which is hereby incorporated by reference.

The third wave region 24 includes two separate portions, only one of which is shown in FIG. 4, which lie adjacent to and outwardly of the second wave regions 22. The third wave regions 24 are each flat having zero wave amplitude and comprise the distal ends 26 of the multi-wave compression spring 10. The third wave region 24 is flat and thereby provides a substantially planar load supporting surface at the spring ends 26 to accommodate uneven axial loading of the compression spring 10. The flat region or third wave region 24 comprises at least one turn 12 of the spring 10.

Each wave region 20, 22, 24 also has a different pitch relative to a reference horizontal line L. The pitch of the first region 20 is the reference angle X between lines L and $L_1$. Line $L_1$ is the centerline of the waves in the first region 20. Similarly, the pitch of the second wave region 22 is shown by reference angle Y between lines L and $L_2$. Line $L_2$ is the centerline of the waves in the second region 22. The centerline (not shown) of the ribbon 18 in the third region 24 is parallel to the line L because ribbon 18 is flat in this region 24. The different pitches of the wave regions results in no residual stress in the formed spring 10 so that in the helical configuration the turns 12 of spring 10 are stacked one upon another without the frictional interfaces which result from the edge-winding forming process for metal multi-wave compression springs which results in substantial residual stresses in the spring.

In one presently preferred embodiment of the composite multi-wave compression spring 10, the spring 10 includes twenty-two total turns 12 of which twenty are active turns with a greater than zero amplitude. The two inactive turns 12 comprise the third wave region 24 or flat shim ends 26 of the spring. This embodiment of the spring 10 has an initial height of 4.00 inches and has been tested to withstand maximum load of 1,005 pounds. Under the maximum load, the spring 10 is compressed to a final longitudinal height of 1.839 inches at an operating temperature of 300° F. This preferred embodiment of the spring 10 weighs 6.5 ounces and the ribbon 18 has a radial wall thickness of 0.48 inches and the spring 10 has inner diameter of 2.00 inches and an outer diameter of 2.96 inches. The ribbon 18 in this preferred embodiment is 0.08 inches thick and has a wave amplitude of 0.096 in the first wave region 20. The second wave region 22 includes six discrete wave sections which incrementally decrease from a maximum wave amplitude of 0.080 inches adjacent the first wave region 20 to a minimum wave amplitude of 0.013 inches adjacent the third wave region 24. The ribbon 18 used to fabricate the spring of a presently preferred embodiment of the invention is IM7/8552. Other fiber materials could be used such as kevlar, glass, boron, or the like. Other matrix materials can be used such as a wide variety of epoxies, polyimides, or carbon. Most preferably, the spring is comprised of a glass based woven tape, webbing, ribbon or weave to which a resin is squirted or otherwise applied to saturate the glass based weave. Such a woven tape product is commercially available from Bally Ribbon Mills of Bally, Pa. as a 2D or 3D glass based tape. Additionally, the woven tape may be overbraided for enhanced performance.

A presently preferred method of fabricating the composite multi-wave compression spring 10 according to the present invention is as follows. A machined polypropylene mold 46 in a generally cylindrical configuration is provided. Other materials can be used for the mold 46 according to the present invention such as eutectic or bismuth alloys, available from Cerro Metal Products of Bellefonte, Pa. Other mold materials include plastics such as nylon, teflon, delrin, and silicone. The mold material should be capable of withstanding the pressures and temperatures used in the thermosetting of the ribbon 18 of graphite fibers in a resin matrix. Furthermore, the mold 46 should be capable of being cut or otherwise having a generally rectangular groove 48 formed therein in the appropriate multi-wave configuration according to the present invention. The groove 48 is cut by a computerized CNC milling operation or other appropriate technique as is well known by those of ordinary skill in the art.

Figure 3A:
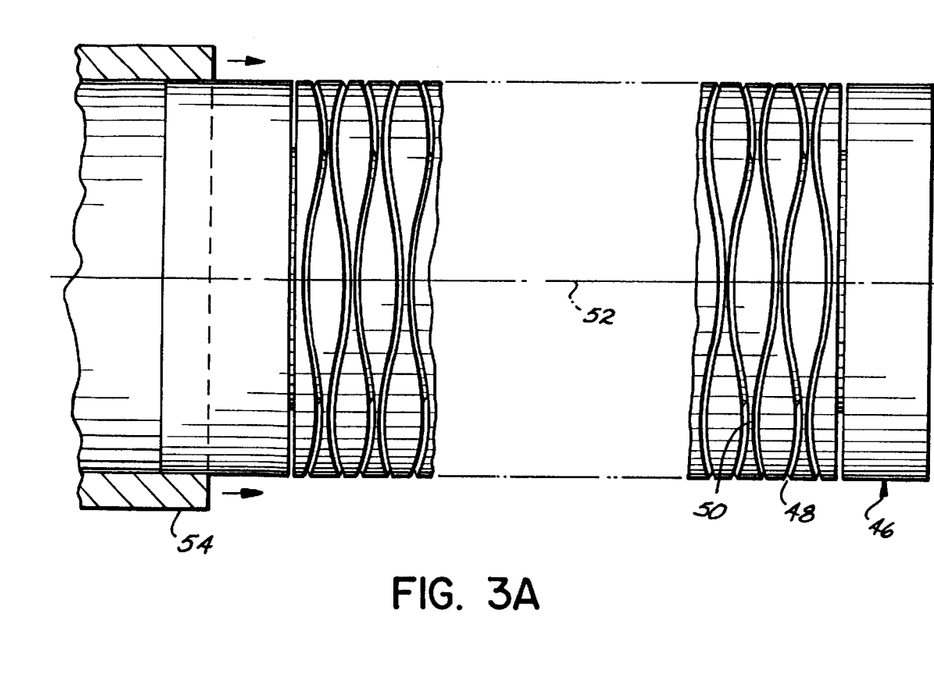
FIGS. 3A and 3B are a plan view and a partially cross-sectional elevational view, respectively, of the mold and sleeve used in manufacturing a composite spring according to one embodiment of the invention.

The groove 48 is thus formed into the exterior surface of the mold 46 in the configuration of a multi-wave sinusoidal wave form as shown in FIG. 3A. Preferably, the groove 48 is cut into a configuration having the three distinct wave regions 20, 22, 24 as previously described herein. The groove has a very minimal spacing 50 between adjacent crests 14 and troughs 16 so that the adjacent turns 12 in the formed spring 10 do not bond to each other in the fabrication process but are aligned for line contact once separated from the mold 46.

After the appropriately configured groove 48 has been cut into the mold 46, the ribbon 18 of graphite fibers 58 in a resin matrix is laid into the groove 48 by any known process. Alternatively, the graphite fibers 58 can be inserted into the groove 48 and then resin is injected therein as opposed to using pre-preg composite tape material. Preferably, the graphite fibers 58 are unidirectional within the ribbon 18 so that once the ribbon 18 is inserted into the groove 48, the graphite fibers 58 are concentrically wound around a longitudinal axis 52 of the mold 46. In an alternative embodiment, the graphite fibers may be twisted, braided, intermingled or positioned in another configuration.

After the ribbon 18 is laid into the groove 48, the composite materials must be cured or thermal set by a combination of pressure and heat over a specified length of time. The appropriate heat, time and pressure parameters to cure the composite ribbon 18 will vary depending upon the materials used and should be determined according to manufacturer specifications of the composite materials. In the preferred embodiment, the thermal set process is accomplished in a minimum of 20 in. Hg vacuum at a temperature of 350° F. for approximately two hours with an autoclave pressure of 90 psi.

Figure 3B:
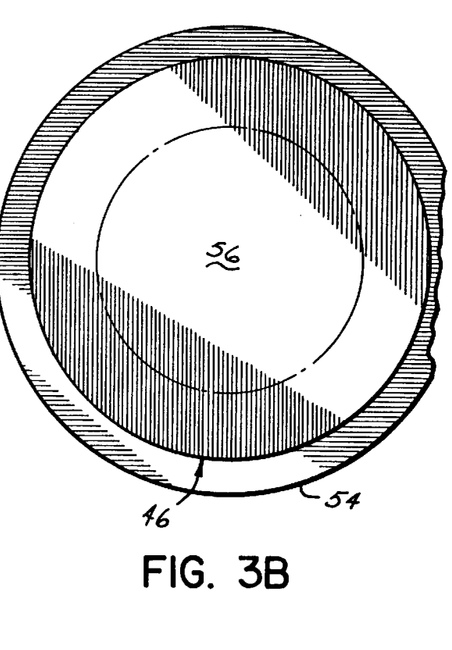

In order to ensure that appropriate pressure is applied during the curing process, one method according to the present invention is to insert the mold 46 and ribbon 18 therein into a solid metal sleeve 54 as shown in FIG. 3B. The sleeve 54 will resist expansion of the mold 46 and ribbon 18 during the curing process to ensure that the graphite fibers and resin matrix bond with minimal voids therein. The open ends of the sleeve 54 may be capped or otherwise closed in order to more fully seal the mold 46 therein. Thermal expansion of the mold 46 may provide the required pressure during the curing process depending on the particular materials employed. Alternatively, the curing process can be accomplished within an autoclave (not shown) to produce the appropriate heat and pressure requirements for the curing process.

After the graphite epoxy and resin matrix ribbon 18 has cured, the resulting composite spring 10 and mold 46 must be separated one from another. Depending upon the material of the mold 46, the mold 46 can is heated to an appropriate melting temperature and melted away from the spring without detrimentally effecting the cured spring 10. The mold material is then collected and reformed into the cylindrical shape for use in the production of a subsequent spring. Eutectic metal alloys can be used to form a mold with a very specific melting temperature. This alloy can be specifically formulated to melt slightly above the cure temperature of the composite material. Following the setting or curing of the spring, the temperature of the oven can be raised slightly to accommodate melting of the mold material. The mold material can be remelted into a new mold. After the spring 10 has been separated from the mold 46, the appropriate anti-friction and encasing coatings can be applied to the spring 10 as previously described in a preferred embodiment of the invention.

Alternatively, a center core portion 56 along the mold longitudinal axis 52 can be bored out and any portion of the mold 46 remaining between the adjacent turns 12 of the spring 10 can be removed by expanding the spring 10 and by crumbling and breaking away those portions of the mold 46.

Figure 6:
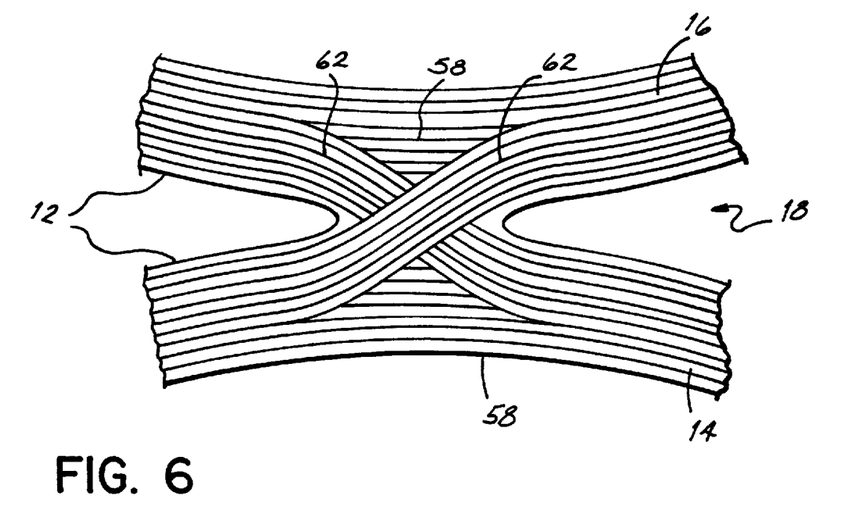
FIG. 6 is a cross-sectional enlarged view of an alternative embodiment of the compression spring showing cross-over fibers extending between adjacent upper and lower turns of the spring.

An alternatively preferred embodiment of the spring 10 according to this invention is shown in FIG. 6 in which mating adjacent wave crests 14 and troughs 16 are bound together by a plurality of cross-over fibers 62. The cross-over fibers 62 are selected ones of the fibers 58 used to form the ribbon in the successive turns of the spring 10. Due to the unique manufacturing process described hereinabove of the spring 10, the cross-over fibers 62 can be introduced into the spring 10 as the ribbon is being laid-up into the mold. The cross-over fibers 62 may extend multi-directionally between the adjacent crests 14 and troughs 16 and alone, or in combination with the binding resin 64, serve to bind the turns 12 of the spring 10 together to minimize buckling and hysteresis of the spring 10.

Figure 7:
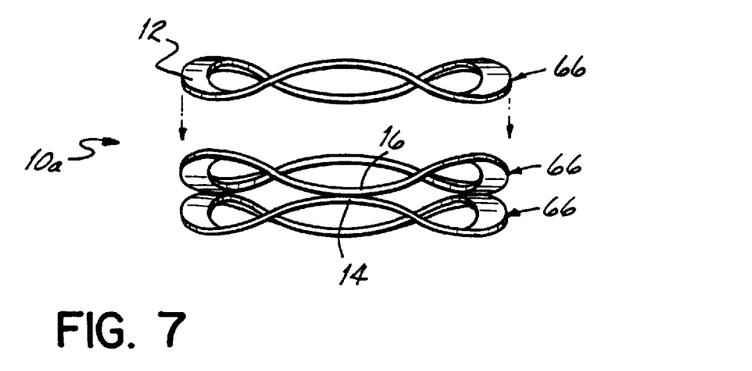
FIG. 7 is a perspective view of another alternative embodiment of the compression spring comprised of a plurality of stacked composite multi-wave rings.

A still further preferred embodiment of the spring 10a according to this invention is comprised of a plurality of multi-wave rings 66 stacked one upon another as shown in FIG. 7. Each multi-wave ring 66 comprises one 360° turn of the spring 10a and includes an integral number of the generally sinusoidal successive wave crests 14 and troughs 16. In a presently preferred embodiment, each multi-wave ring 66 includes three complete waves. The adjacent multi-wave rings 66 are arranged so that the crest 14 of the ring 66 mates with the trough 16 in the adjacent ring 66. One advantage of the spring 10 comprised of stacked multi-wave rings 66 is that under load the mating crests 14 and troughs 16 do not slip relative to each other because the force is directed axially with no tangential component which may cause the upper turn 12 to shift relative to the lower turn 12 of the spring 10, particularly with the varying amplitude wave regions of the spring of FIG. 1. The mating crests 14 and troughs 16 may be bound together with the binding resin 64 and/or cross-over fibers 62 as previously described.

It will be appreciated that spring design for fatigue applications involves more than simply selecting the physical dimensions of the spring material. The design entails choosing a cost effective material that satisfies the service life requirements under the expected load, stress, and environmental conditions. Generally, the parameters which determine spring design in fatigue applications include available space, required loads and deflections, methods of stressing, rate of load application, operating environment, and minimum fatigue life with required reliability. The fatigue life of a spring is related to material strength, stress and environment. Higher material strength is a very important factor in improving fatigue life. Graphite fiber composites are very high-strength materials. For comparable springs subjected to unidirectional loading and equal maximum stresses, the spring made from a stronger material such as a graphite reinforced composite will ultimately last longer in a fatigue environment.

The composite multi-wave compression spring according to this invention has increased fatigue life and is capable of handling higher loads. The method used to fabricate the composite wave spring does not induce sizable residual stresses during manufacturing compared to the fabrication process for metal multi-wave springs.

From the above disclosure of the general principles of the present invention and the preceding detailed description of preferred embodiments, those skilled in the art will readily comprehend the various modifications to which the present invention is susceptible. Therefore, we desire to be limited only by the scope of the following claims and equivalents thereof.

We claim:

1. A composite multi-wave compression spring comprising:

a ribbon of graphite fibers in a resin matrix, said ribbon having a plurality of turns around a longitudinal spring axis, each said turn having a plurality of waves including successive crests and troughs, each said crest and each said trough being aligned with a trough and a crest, respectively, in an adjacent said turn of the spring;

wherein selected ones of said crests and said troughs are bound to said trough and said crest, respectively, aligned therewith in said adjacent turn of the spring.

2. The spring of claim 1 wherein said resin matrix is used to bind said selected crests and troughs to said troughs and crests, respectively.

3. The spring of claim 1 wherein said selected crests and troughs are not bound to said troughs and crests, respectively, across an entire width of said ribbon.

4. The spring of claim 3 wherein said selected crests and troughs are bound to said troughs and crests, respectively, only at an outer peripheral region of said ribbon.

5. The spring of claim 1 wherein said selected crests and troughs are bound to said troughs and crests, respectively, by selected ones of said fibers which cross-over therebetween.

6. A composite multi-wave compression spring comprising:

a plurality of multi-wave rings joined together in a stacked configuration, each said multi-wave ring comprising a ribbon of graphite fibers in a resin matrix and having successive crests and troughs to form a single turn of the spring, wherein selected ones of said crests and said troughs are aligned with a trough and a crest, respectively, in an adjacent said multi-wave ring of the spring, wherein said resin matrix is used to bind said selected crests and troughs to said troughs and crests, respectively and further wherein said selected crests and troughs are not bound to said troughs and crests, respectively, across an entire width of said ribbons.

7. The spring of claim 6 wherein said selected crests and troughs are bound to said troughs and crests, respectively, only at an outer peripheral region of said ribbons.

8. A method of making a multi-wave compression spring comprising:

forming a generally helical groove in a mold, said groove having a plurality of turns around a longitudinal axis of said mold, each said turn of said groove having a plurality of waves including successive crests and troughs, each said crest and each said trough being aligned with a trough and a crest, respectively, in an adjacent turn of said groove;

inserting a ribbon of graphite fibers in a resin matrix into said groove;

setting said ribbon by subjecting said mold and ribbon to pressure, vacuum and heat for a specified length of time by inserting said mold and ribbon into a sleeve and closing open ends of said sleeve with said mold and ribbon therein; and separating said set ribbon from said mold.

9. The method of claims 8 wherein said separating comprises:

melting said mold away from said set ribbon.

10. The method of claim 8 wherein said separating comprises:

boring out a center of said mold; and expanding said set ribbon and thereby removing portions of said mold between adjacent turns of said set ribbon.

11. The method of claim 8 further comprising:

applying an anti-friction coating to said set ribbon after it is separated from said mold.

12. The method of claim 11 further comprising:

expanding said set ribbon prior to applying said anti-friction coating to ensure that said anti-friction coating is applied to regions of contact between said aligned crests and troughs in said adjacent turns of said ribbon.

13. The method of claim 8 wherein said forming of said groove further comprises:

forming first and second wave regions of said groove, said first wave region being disposed generally within the middle turns of said groove and each said crest and trough within said first wave region having a constant amplitude, said second wave region being disposed adjacent to said first wave region and amplitudes of said troughs and of said crests in said second wave region decreasing the farther away it is from said first wave region; and forming a flat region adjacent to said second wave region, said flat region including at least one turn of said groove and an end turn of said groove.

14. The method of claim 13 further comprising:

forming a pair of said second wave regions and a pair of said flat regions spaced about said first wave region.

15. A method of making a multi-wave compression spring comprising:

forming a generally helical groove in a mold, said groove having a plurality of turns around a longitudinal axis of said mold, each said turn of said groove having a plurality of waves including successive crests and troughs, each said crest and each said trough being aligned with a trough and a crest, respectively, in an adjacent turn of said groove:

inserting a ribbon of graphite fibers in a resin matrix into said groove;

setting said ribbon;

separating said set ribbon from said mold;

compressing said set ribbon after it has been separated from said mold; and sealing regions of contact between said aligned crests and troughs in said adjacent turns of said ribbon to inhibit contaminants from interfering with said contact regions.

16. A method of making a multi-wave compression spring comprising:

forming a generally helical groove in a mold, said groove having a plurality of turns around a longitudinal axis of said mold, each said turn of said groove having a plurality of waves including successive crests and troughs, each said crest and each said trough being aligned with a trough and a crest, respectively, in an adjacent turn of said groove;

inserting a ribbon of graphite fibers in a resin matrix into said groove;

setting said ribbon;

separating said set ribbon from said mold;

binding said aligned crests and troughs in said adjacent turns of said ribbon together.

17. The method of claim 16 wherein said binding is accomplished with said resin matrix.

18. The method of claim 16 wherein said binding is accomplished by crossing over selected ones of said fibers between said aligned crests and troughs.

* * * * *